(12) United States Patent
Geyer et al.

(10) Patent No.: US 7,256,561 B2
(45) Date of Patent: Aug. 14, 2007

(54) METHOD FOR OPERATING A ROTATING ELECTRICAL MACHINE

(75) Inventors: Tobias Geyer, Zürich (CH); Georgios Papafotiou, Adliswil (CH); Manfred Morari, Küssnacht (CH)

(73) Assignees: ABB Research Ltd, Zurich (CH); Eidgenossische Technische Hochschule Zurich, Zurich (CH)

( * ) Notice: Subject to any disclaimer, the term of this patent is extended or adjusted under 35 U.S.C. 154(b) by 62 days.

(21) Appl. No.: 11/295,546

(22) Filed: Dec. 7, 2005

(65) Prior Publication Data

US 2006/0125435 A1 Jun. 15, 2006

(30) Foreign Application Priority Data

Dec. 10, 2004 (EP) ................................ 04405767

(51) Int. Cl.
*H02K 21/00* (2006.01)
(52) U.S. Cl. .................. 318/254; 318/138; 318/439
(58) Field of Classification Search ................ 318/254, 318/138, 439, 567, 569; 123/90.1
See application file for complete search history.

(56) References Cited

U.S. PATENT DOCUMENTS 4,763,060 A 8/1988 Takahashi

2005/0209045 A1* 9/2005 Lewis .......................... 477/107

FOREIGN PATENT DOCUMENTS

| EP | 0 812 059 A1 | 12/1997 |
| FR | 2 791 488 | 9/2000 |
| WO | 99/53607 | 10/1999 |

* cited by examiner

*Primary Examiner*—Karen Masih
(74) *Attorney, Agent, or Firm*—Buchanan Ingersoll & Rooney PC

(57) ABSTRACT

A method is specified for operating a rotating electrical machine, in which the rotating electrical machine is connected in terms of phase to a converter circuit, having a DC voltage circuit, for connecting at least two voltage levels, and the phases of the converter circuit are connected to the DC voltage circuit in accordance with a selected switching state combination of switching states for power semiconductor switches in the converter circuit. In order to reduce the switching frequency of the power semiconductor switches, a prediction is made of the further behavior of the overall system and according to this prediction, the optimum switching state combination is selected starting from the preceding selected switching state combination and with respect to the number of transitions from the preceding selected switching state combination to the selected switching state combination and with respect to the respective predetermined value range for the torque of the rotating electrical machine, for the magnetic stator flux of the rotating electrical machine and for the potential at the subconnection.

11 Claims, 3 Drawing Sheets

METHOD FOR OPERATING A ROTATING ELECTRICAL MACHINE

TECHNICAL FIELD

The invention relates to the field of operating methods for rotating electrical machines. It is based on a method for operating a rotating electrical machine in accordance with the precharacterizing clause of the independent claim.

PRIOR ART

High-power voltage converter circuits are used in many applications today. Such a converter circuit usually connects three voltage levels and is often used for operating rotating electrical machines, in particular in synchronous and asynchronous machines, which rotating electrical machines generally have three stator windings. In a conventional method for operating a rotating electrical machine, it is connected in terms of phase to such a converter circuit, having a DC voltage circuit, for connecting generally m voltage levels, where $m \geq 2$. In the case of a converter circuit for connecting typically three voltage levels, the DC voltage circuit is formed by a first capacitor and by a second capacitor which is connected in series with the first capacitor, the DC voltage circuit also having a first main connection at the first capacitor, a second main connection at the second capacitor and a subconnection formed by the two series-connected capacitors. Furthermore, the converter circuit for connecting three voltage levels comprises power semiconductor switches, which are generally interconnected. In relation thereto, FIG. 1 shows an embodiment of a conventional three-phase converter circuit for connecting three voltage levels. According to the method, the phases of the converter circuit are generally connected to the DC voltage circuit in accordance with a selected switching state combination of switching states for the power semiconductor switches in the converter circuit. In the case of a converter circuit for connecting three voltage levels, the phases of the converter circuit are accordingly connected to the first main connection, to the second main connection or to the subconnection according to a selected switching state combination of switching states for the power semiconductor switches in the converter circuit. In a state diagram shown in FIG. 2, these switching state combinations and their transitions with respect to one another are shown, the "+" representing a connection of the corresponding phase to the first main connection, "−" representing a connection of the corresponding phase to the second main connection and "0" representing a connection of the corresponding phase to the subconnection.

The selection of the corresponding switching state combinations takes place, for example, according to the known "direct torque control" (DTC) method, in which the latest actual value for the torque of the rotating electrical machine, the magnetic stator flux of the rotating electrical machine and the potential at the subconnection are initially in each case compared with an associated predetermined value range. The respectively predetermined value range is or can be time-variant and is usually determined by an upstream closed-loop control circuit from reference values for the torque of the rotating electrical machine, the magnetic stator flux of the rotating electrical machine and the potential at the subconnection. If a latest actual value now exceeds its associated predetermined value range, a switching state combination is selected from a table as a function of the preceding selected switching state combination such that the latest value resulting for this switching state combination could, if need be, again be within the associated value range, this not being guaranteed. In addition, a switching state combination is always only selected either with respect to the latest actual value for the torque, the magnetic stator flux or the potential when the associated value range is exceeded. The latest actual value for the torque, the magnetic stator flux and the potential is not considered jointly.

One problem with a method described above for operating a rotating electrical machine by means of the known "direct torque control" is the fact that there are typically a plurality of transitions between the preceding selected switching state combination and the latest selected switching state combination, these transitions being illustrated in FIG. 2 as lines between the switching state combinations. The switching state combinations and the transitions from one switching state combination to another are generally stored permanently in the table, in which case typically not all of the combination possibilities for the switching state combination are stored in the table, as shown in FIG. 2. Furthermore, in the case of "direct torque control", only one switching state combination is selected as a function of the preceding selected switching state combination with the associated transitions, which is stored in the table and which brings the latest value resulting for the selected switching state combination back to within the associated value range again. Switching state combinations to be selected as an alternative, in particular with possibly fewer transitions to the preceding selected switching state combination, are not stored in the table. A plurality of transitions between switching state combinations do generate, however, a large number of switching operations for the power semiconductor switches in the converter circuit, as a result of which the switching frequency of the power semiconductor switches is increased. However, such a high switching frequency produces heat loss (a higher energy consumption) in the power semiconductor switches in the converter circuit, as a result of which heat loss the power semiconductor switches age more quickly and may be damaged or even destroyed.

SUMMARY OF THE INVENTION

It is therefore the object of the invention to specify a method for operating a rotating electrical machine, by means of which the switching frequency of power semiconductor switches in a converter circuit, which is connected in terms of phase to the rotating electrical machine, for connecting m voltage levels can be reduced, where $m \geq 2$. This object is achieved by the features of claim 1. Advantageous developments of the invention are specified in the dependent claims.

In the method according to the invention for operating a rotating electrical machine, the rotating electrical machine is connected in terms of phase to a converter circuit, having a DC voltage circuit, for connecting m voltage levels, where $m \geq 2$. In accordance with the method, in one step (a) the phases of the converter circuit are connected to the DC voltage circuit in accordance with a selected switching state combination of switching states for power semiconductor switches in the converter circuit. According to the invention, the selection of this switching state combination takes place in the following further steps:

(b) beginning with a starting sampling time k for a selectable number N of sampling times: determination of all the permissible switching state combinations at each of the N sampling times, where $N \geq 1$, (c) formation of switching state sequences for each determined switching state combination at the starting sampling time k, each switching state sequence being an arrangement of determined switching state combinations of the N sampling times next to one another in a row, said switching state combinations being associated with the respective switching state combination at the starting sampling time k, (d) for each of the switching state sequences, calculation of a torque trajectory of the rotating electrical machine and a magnetic stator flux trajectory of the rotating electrical machine from determined state value sets of the rotating electrical machine and the converter circuit for the starting sampling time k up to the sampling time k+N, (e) selection of the switching state sequences, in which an associated torque trajectory and a magnetic stator flux trajectory at the (k+N)-th sampling time is in each case within a predetermined value range, or in which the trajectory values of an associated torque trajectory and the trajectory values of an associated magnetic stator flux trajectory with respect to the k-th sampling time up to the (k+N)-th sampling time approach the respective predetermined value range, (f) for each of the selected switching state sequences, determination of the number of times n until the extrapolation of the trajectory values of the associated torque trajectory (M) or the trajectory values of the magnetic stator flux trajectory with respect to the (k+N−1)-th sampling time and (k+N)-th sampling time is outside the respective predetermined value range, (g) for each of the selected switching state sequences, determination of the total number of switching transitions s of the associated determined switching state combinations, (h) for each of the selected switching state sequences, calculation of a quality value c from the number of times n and the total number of switching transitions s, (i) setting that determined switching state combination at the starting sampling time k as the selected switching state combination with which the quality value c of the associated selected switching state sequence is at its smallest, (j) repetition of steps (a) to (i), where k=k+1.

By means of steps (b) to (j), the optimum switching state combination is always advantageously selected on the basis of the preceding selected switching state combination and with respect to the number of transitions from the preceding selected switching state combination to the selected switching state combination and with respect to the respective predetermined value range for the torque of the rotating electrical machine and for the magnetic stator flux of the rotating electrical machine. The number of switching operations of the power semiconductor switches in the converter circuit can thus advantageously be reduced, and thus the switching frequency of the power semiconductor switches can be reduced. The reduced switching frequency results in less heat loss being produced in the power semiconductor switches, as a result of which the power semiconductor switches age more slowly and can be protected to a large extent against damage or destruction. In addition, the respective value ranges are overall adhered to more effectively.

In general, the method according to the invention thus makes it possible to predict the behavior of the rotating electrical machine over more than one sampling time for determined switching state sequences, the horizon of N sampling times being shifted through one sampling time by step (j), after the application of steps (a) to (i), and then, however, always only the first switching state combination, in particular the k-th switching state combination, of a switching state sequence being selected. A quality criterion then approximates or simulates the switching frequency.

Finally, in the method according to the invention, the switching state combinations are also considered jointly with respect to all of the relevant variables, in particular the torque and the magnetic stator flux, when the associated value range is exceeded.

These and further objects, advantages and features of the present invention will be disclosed in the description detailed below relating to preferred embodiments of the invention in conjunction with the drawing.

Figure 1:
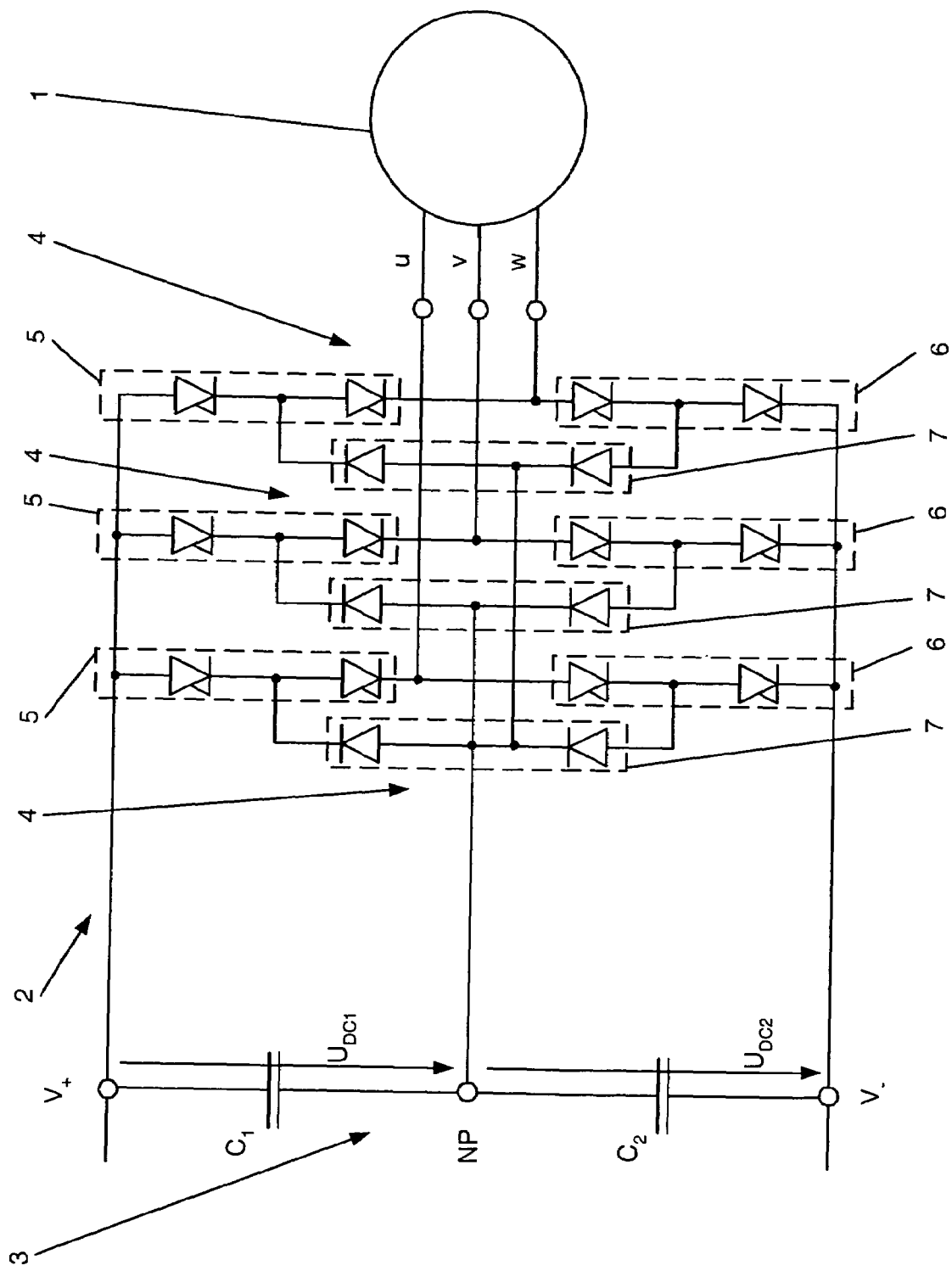
FIG. 1 shows an embodiment of a three-phase converter circuit for connecting three voltage levels.

The references used in the drawing and their significance are listed by way of summary in the list of references. In principle, identical parts are provided with the same references in the figures. The embodiments described represent examples of the subject matter of the invention and have no restrictive effect.

APPROACHES TO IMPLEMENTING THE INVENTION

FIG. 1 shows an embodiment of a three-phase converter circuit 2 for connecting three voltage levels, a rotating electrical machine 1 being connected in terms of phase to a DC voltage circuit 3 of the converter circuit 2. In general, the rotating electrical machine 1 can be connected to a converter circuit 2 for connecting m voltage levels, in this case m≧2. In accordance with FIG. 1, the DC voltage circuit 3 is formed by a first capacitor $C_1$ and by a second capacitor $C_2$ which is connected in series with the first capacitor $C_1$, $C_1$ being essentially equal in value to $C_2$. The DC voltage circuit 3 in accordance with the exemplary embodiment of a converter circuit for connecting three voltage levels as shown in FIG. 1 has a first main connection $V_+$ at the first capacitor $C_1$, a second main connection $V_-$ at the second capacitor $C_2$ and a subconnection NP formed by the two series-connected capacitors $C_1$, $C_2$. Furthermore, the converter circuit shown in FIG. 1 comprises a part-converter system 4, which is provided for each phase u, v, w and in each case is formed by a first switching group 5, by a second switching group 6 and by a third switching group 7, each switching group 5, 6, 7 being formed by two series-connected power semiconductor switches. Furthermore, in each part-converter system 4, the first switching group 5 is connected to the first main connection $V_+$, and the second switching group 6 is connected to the second main connection $V_-$. In addition, the first switching group 5 is connected in series with the second switching group 6, the connection point between the first switching group 5 and the second switching group 6 forming a phase connection. The third switching group 7, which is in the form of a clamping switching group, is connected to the first switching group 5, in particular to the connection point between the two series-connected power semiconductor switches of the first switching group 5. In addition, the third switching group 7 is connected to the second switching group 6, in particular to the connection point between the two series-connected power semiconductor switches of the second switching group 6. Furthermore, the third switching group 7, in particular the connection point between the two series-connected power semiconductor switches of the third switching group 7, is connected to the subconnection NP. The power semiconductor switches of the first and second switching groups 5, 6 are, as shown in FIG. 1, in the form of drivable bidirectional power semiconductor switches, the power semiconductor switches of the third switching group 7 being in the form of unidirectional nondrivable power semiconductor switches. However, it is also conceivable for the power semiconductor switches of the third switching group 7 to also be in the form of drivable bidirectional power semiconductor switches.

Figure 2:
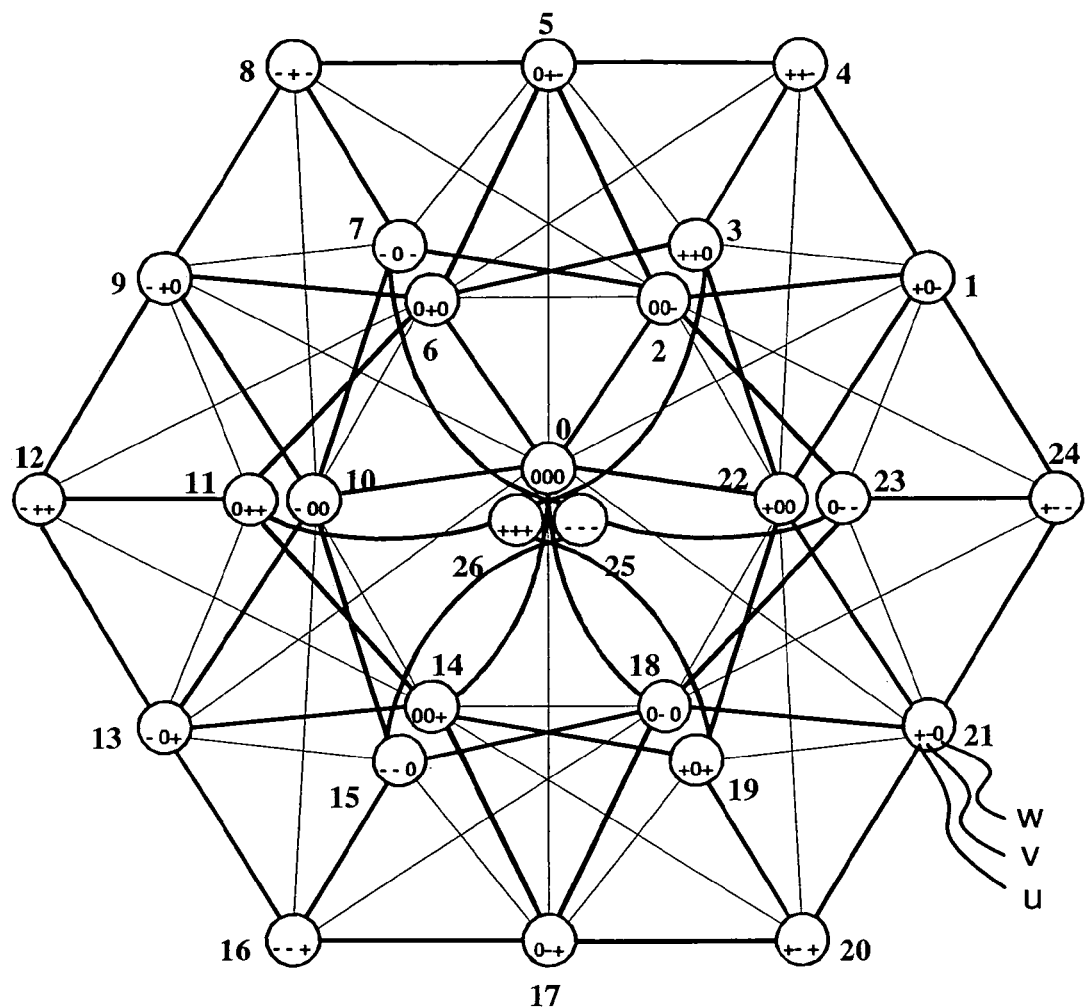
FIG. 2 shows a state diagram having switching state combinations of the phases of the converter circuit.

According to the method, the phases u, v, w of the converter circuit 2, which is generally a converter circuit 2 for connecting m voltage levels, are now connected, in a first step (a), to the DC voltage circuit 3 in accordance with a selected switching state combination $SK_{a,k}$ of switching states for the power semiconductor switches in the converter circuit 2. As has already been mentioned at the outset, FIG. 2a shows, by way of example, a state diagram of switching state combinations of a converter circuit 2 for connecting three voltage levels, "+" representing a connection of the corresponding phase u, v, w to the first main connection $V_+$, "−" representing a connection of the corresponding phase u, v, w to the second main connection $V_-$ and "0" representing a connection of the corresponding phase u, v, w to the subconnection NP, and the lines between the switching state combinations SK representing permissible transitions between the switching state combinations SK. Mention will be made of the fact that a state diagram of switching state combinations of a converter circuit 2, for example, for connecting m=5 voltage levels would be represented differently. In particular, those skilled in the art can reliably implement a converter circuit in which, on the basis of a switching state combination SK, all possible switchable switching state combinations SK of this converter circuit can be switched, without restriction.

According to the invention, the selection of the abovementioned switching state combination $SK_{a,k}$ takes place in the following further steps:

In step (b), beginning with a starting sampling time k for a selectable number N of sampling times, all the permissible switching state combinations $SK_k, \ldots, SK_{k+N-1}$ are determined at each of the N sampling times, preferably starting from the respectively preceding determined switching state combination $SK_{k-1}$, where $N \geq 1$, and where the first preceding determined switching state combination $SK_{k-1}$ is preferably the preceding selected switching state combination $SK_{a,k-1}$, i.e. at sampling time k−1.

In step (c), switching state sequences SSK for each determined switching state combination $SK_k$ are formed at the starting sampling time k, each switching state sequence SSK being an arrangement of determined switching state combinations $SK_k, \ldots, Sk_{k+N-1}$ of the N sampling times next to one another in a row, said switching state combinations $SK_k, \ldots, Sk_{k+N-1}$ being associated with the respective switching state combination $SK_k$ at the starting sampling time k. As can be seen in the illustrations, such a switching state sequence SSK represents, by way of example, a series of possible switching state combinations $SK_k, \ldots, Sk_{k+N-1}$ in accordance with FIG. 2 along the associated lines to one of the possible switching state combinations $SK_k$ at the starting sampling time k.

In step (d), for each of the switching state sequences SSK, a torque trajectory M of the rotating electrical machine 1 and a magnetic stator flux trajectory $\phi$ of the rotating electrical machine 1 is then calculated from determined state value sets $X_{a,k}, \ldots, X_{e,k+N}$ of the rotating electrical machine and the converter circuit for the starting sampling time k up to the sampling time k+N. Each of the abovementioned determined state value sets $X_{e,k}, \ldots, X_{e,k+N}$ contains, for example, two stator flux values $\phi_{eS1,k}, \ldots, \phi_{eS1,k+N}$; $\phi_{eS2,k}, \ldots, e_{S2,k+N}$, two rotor flux values $\phi_{eR1,k}, \ldots, \phi_{eR1,k+N}$; $\phi_{eR2,k}, \ldots, \phi_{eR2,k+N}$ and possibly a speed value $V_{e,k}, \ldots, V_{e,k+N}$. In order to determine the state value sets $X_{e,k}, \ldots, X_{e,k+N}$, initially the two stator flux values $\phi_{eS1,k}$; $\phi_{eS2,k}$ at the sampling time k, the two rotor flux values $\phi_{eR1,k}$; $\phi_{eR2,k}$ at the sampling time k and possibly the speed value $V_{e,k}$ at the sampling time k are determined, for example, by measurement or estimation, these values forming the state value set $X_{e,k}$ at the sampling time k. From the state value set $X_{e,k}$ at the sampling time k, trajectory values $M_{T,k}$; $\phi_{T,k}$ at the sampling time k of the torque trajectory M and the magnetic stator flux trajectory $\phi$ are then calculated according to a calculation model known to those skilled in the art which describes or functionally simulates the electrical machine 1 and the converter circuit 2. Then, in accordance with the calculation model, the state value set $X_{e,k+1}$ at the sampling time k+1 is determined by calculation as a function of the state value set $X_{e,k}$ at the sampling time k and as a function of the determined switching state combinations $SK_k$ at the sampling time k of the associated switching state sequence SSK and, from this, the trajectory values $M_{T,k+1}$; $\phi_{T,k+1}$ at the sampling time k+1 of the torque trajectory M and the magnetic stator flux trajectory $\phi$ are then calculated. The calculation of the state value sets $X_{e,k+2}, \ldots, X_{e,k+N}$ for the sampling times k+2 to k+N takes place in analogy to the above-explained calculation of the state value set $X_{e,k+1}$, in which case, for each calculation of the state value sets $X_{e,k+2}, \ldots, X_{e,k+N}$, in each case the associated preceding calculated state value sets $X_{e,k+1}, \ldots, X_{e,k+N-1}$ and the determined switching state combinations $SK_{k+1}, \ldots, Sk_{k+N-1}$ at the sampling time k+1 l to k+N−1 of the associated switching state sequence SSK are used. The calculation, following from the state value sets $X_{e,k+2}, \ldots, X_{e,k+N}$, of the trajectory values $M_{T,k+2}, \ldots, M_{T,k+N}$; $\phi_{T,k+2}, \ldots, \phi_{T,k+N}$ for the sampling times k+2 to k+N likewise takes place in analogy to the above-described calculation of the trajectory values $M_{T,k}$; $\phi_{T,k}$; $M_{T,k+1}$; $\phi_{T,k+1}$ for the sampling times k and k+1. Owing to the above-described calculation of the trajectory values $M_{T,k}, \ldots, M_{T,k+N}$; $\phi_{T,k}, \ldots, \phi_{T,k+N}$, said torque trajectory M of the rotating electrical machine 1 and a magnetic stator flux trajectory $\phi$ of the rotating electrical machine 1 result for each switching state sequence SSK, a schematic profile being shown in FIG. 3 by way of example of such calculated torque trajectories M of associated switching state sequences SSK for N=2 sampling times and, in this case, the points of the torque trajectories M corresponding to the associated determined trajectory values $M_{T,k}, \ldots, M_{T,k+N}$. Mention will be made of the fact that, initially, all of the state value sets $X_{e,k}, \ldots, X_{e,k+N}$ for the sampling times k to k+N can also be determined in accordance with the above-explained procedure and, accordingly, the respective trajectory values $M_{T,k}, \ldots, M_{T,k+N}$; $\phi_{T,k}, \ldots, \phi_{T,k+N}$ for the sampling times k to k+N are calculated therefrom for the purpose of forming the torque trajectory M and the magnetic stator flux trajectory $\phi$ according to the above procedure.

In the further step (e), the switching state sequences $SSK_a$ are then selected in which an associated torque trajectory M and a magnetic stator flux trajectory φ at the (k+N)-th sampling time are in each case within a predetermined value range. Based on the torque trajectories M shown in FIG. 3, this would only apply to the upper two torque trajectories M, but not to the lower torque trajectory M, the predetermined value range in FIG. 3 being indicated by the two dashed horizontal lines. Mention will be made of the fact that the respectively predetermined value range is time-variant and is usually determined by an upstream closed-loop control circuit from reference values for the torque of the rotating electrical machine and the magnetic stator flux of the rotating electrical machine 1, such closed-loop control circuits being known to those skilled in the art. As an alternative, the switching state sequences $SSK_a$ are then selected in which the trajectory values $M_{T,k}, \ldots, M_{T,k+N}$ of an associated torque trajectory M and the trajectory values $φ_{T,k}, \ldots, φ_{T,k+N}$ of an associated magnetic stator flux trajectory φ with respect to the k-th sampling time up to the (k+N)-th sampling time approach the respective predetermined value range.

Figure 3:
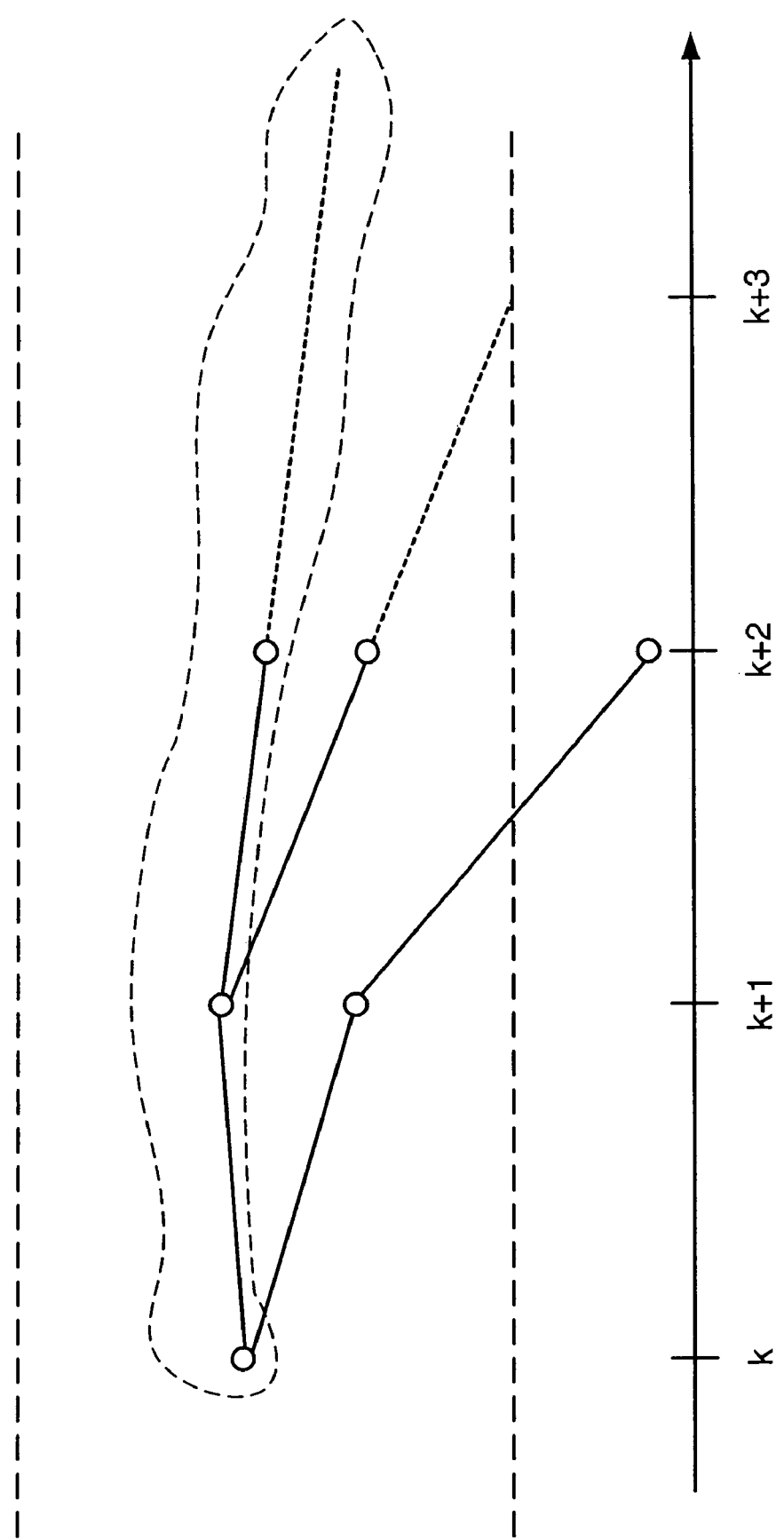
FIG. 3 shows a schematic profile of calculated torque trajectories for N=2 sampling times.

In step (f), for each of the selected switching state sequences $SSK_a$, the number of times n is thereupon determined until the extrapolation of the trajectory values $M_{T,k+N-1}, M_{T,k+N}$ of the associated torque trajectory M or the trajectory values $φ_{T,k+N-1}, φ_{T,k+N}$ of the magnetic stator flux trajectory φ with respect to the (k+N-1)-th sampling time and (k+N)-th sampling time is outside the respective predetermined value range, i.e. until one of the extrapolations leaves the respective predetermined value range first or crosses the boundaries of the respective predetermined value range. In FIG. 3, the respective extrapolation for the two upper relevant torque trajectories M is illustrated with dashed lines, the extrapolation of one upper relevant torque trajectory M as shown in FIG. 3 leaving the predetermined value range as soon as at k+3, the extrapolation of the other upper relevant torque trajectory M, which is bordered with dashed lines in order to illustrate it more clearly, is, however, still within the predetermined value range at k+3.

In addition, in step (g), for each of the selected switching state sequences $SSK_a$, the total number of switching transitions s of the associated determined switching state combinations $SK_k, \ldots, Sk_{k+N-1}$ is determined.

Furthermore, in step (h), for each of the selected switching state sequences $SSK_a$, a quality value c is calculated from the number of times n and the total number of switching transitions s. The quality value c is preferably calculated by dividing the total number of switching transitions s by the number of times n.

In a further step (i), that determined switching state combination $SK_k$ at the starting sampling time k is set as the selected switching state combination $SK_{a,k}$ with which the quality value c of the associated selected switching state sequence $SSK_a$ is at its smallest.

Finally, in step (j), the steps (a) to (i) are repeated, where k=k+1, i.e. the selection of the switching state combination $SK_{a,k}$ takes place, for k=k+1, in accordance with the sequence described above according to steps (a) to (i). N is constant for each of steps (a) to (j).

By means of steps (b) to (j) and, in particular, by means of the extrapolation, it is possible to predict the further behavior of the overall system, i.e. the rotating electrical machine 1 and the converter circuit 2 associated therewith and, accordingly, it is advantageously always possible to select the optimum switching state combination $SK_{a,k}$ on the basis of the preceding selected switching state combination $SK_{a,k-1}$ and with respect to the number of transitions from the preceding selected switching state combination $SK_{a,k-1}$ to the selected switching state combination $SK_{a,k}$ and with respect to the respective predetermined value range for the torque of the rotating electrical machine 1 and for the magnetic stator flux of the rotating electrical machine 1. It is thus advantageously possible to reduce the number of switching operations for the power semiconductor switches in the converter circuit 2 and thus to reduce the switching frequency of the power semiconductor switches. The power semiconductor switches advantageously generate less heat loss owing to the reduced switching frequency and, as a result, have a lower energy consumption such that the power semiconductor switches, as a result, age more slowly and can be protected to a large extent against damage or destruction.

Mention will be made of the fact that steps (a) to (j) can be implemented in the form of software and this software can then be loaded, for example, onto a computer system, in particular using a digital signal processor, and run on this computer system.

As mentioned above, FIG. 1 shows a converter circuit 2 for connecting m=3 voltage levels, the DC voltage circuit 3 then having m-2 subconnections NP, i.e. a single subconnection NP. For the general case of a converter circuit 2 for connecting m voltage levels, where m≧3, the converter circuit 2 then has m-2 subconnections NP at the DC voltage circuit 3. With respect to step (d) of the method according to the invention, this means that, for each of the switching state sequences SSK, in addition m-2 potential trajectories $U_{NP}$ for potentials at the m-2 subconnections NP are calculated from determined state value sets $X_{e,k}, \ldots, X_{e,k+N}$ of the rotating electrical machine 1 and the converter circuit 2 for the starting sampling time k up to the sampling time k+N. The mentioned calculation takes place in analogy to the calculation explained above for the corresponding torque trajectory M of the rotating electrical machine 1 and magnetic stator flux trajectory φ of the rotating electrical machine 1. Furthermore, for m≧3, with respect to step (e), the switching state sequences $SSK_a$ will be selected in which, in addition, associated m-2 potential trajectories $U_{NP}$ at the (k+N)-th sampling time are in each case within a predetermined value range, or in which, in addition, the trajectory values $U_{NP,k}, \ldots, U_{NP,k+N}$ of associated m-2 potential trajectories $U_{NP}$ with respect to the k-th sampling time up to the (k+N)-th sampling time approach the respective predetermined value range. In addition, for m≧3, with respect to step (f), for each of the selected switching state sequences $SSK_a$, the number of times n is determined until the extrapolation of the trajectory values $M_{T,k+N-1}, M_{T,k+N}$ of the associated torque trajectory M or the trajectory values $φ_{T,k+N-1}, φ_{T,k+N}$ of the magnetic stator flux trajectory φ or the trajectory values $U_{NP,k+N-1}, U_{NP,k+N}$ of the m-2 potential trajectories $U_{NP}$ with respect to the (k+N-1)-th sampling time and (k+N)-th sampling time is outside the respective predetermined value range. It goes without saying that, for m≧3, steps (a) to (c) and (g) to (j) are maintained.

For m≧3, it is now possible, by means of the steps (b) to (j) and, in particular, by means of the extrapolation, to predict the further behavior of the overall system, i.e. the rotating electrical machine 1 and the converter circuit 2 associated therewith, and, accordingly, it is advantageously always possible to select the optimum switching state combination $SK_{a,k}$ on the basis of the preceding selected switching state combination $SK_{a,k-1}$ and with respect to the number of transitions from the preceding selected switching state combination $SK_{a,k-1}$ to the selected switching state combination $SK_{a,k}$ and with respect to the respective predetermined value range for the torque of the rotating electrical machine 1, for the magnetic stator flux of the rotating electrical machine 1 and for the m−2 potential at the m−2 subconnections NP. It is thus advantageously possible to reduce the number of switching operations for the power semiconductor switches in the converter circuit 2, as has already been mentioned, and thus to reduce the switching frequency of the power semiconductor switches.

In general, steps (b) and (c) are advantageously omitted in a step (k), and a switching state sequence SSK for the preceding selected switching state combination $SK_{a,k-1}$ is formed, the switching state sequence SSK in this case being an arrangement of N preceding selected switching state combinations $SK_{a,k-1}$ next to one another in a row and, in addition, the preceding selected switching state combination $SK_{a,k-1}$ being set as the selected switching state combination $SK_{a,k}$ and finally step (d) is applied and steps (e) to (i) are omitted if the trajectory values $M_{T,k}, \ldots, M_{T,k+N}$ of the associated torque trajectory M and the trajectory values $\phi_{T,k}, \ldots, \phi_{T,k+N}$ of the associated magnetic stator flux trajectory $\phi$ with respect to the k-th sampling time up to the (k+N)-th sampling time are within the respective predetermined value range. For m≧3, in step (k), steps (b) and (c) are omitted and a switching state sequence SSK for the preceding selected switching state combination $SK_{a,k-1}$ is formed, the switching state sequence SSK in this case being an arrangement of N preceding selected switching state combinations $SK_{a,k-1}$ next to one another in a row, and, in addition, the preceding selected switching state combination $SK_{a,k-1}$ being set as the selected switching state combination $SK_{a,k}$ and finally step (d) being applied and steps (e) to (i) being omitted if the trajectory values $M_{T,k}, \ldots, M_{T,k+N}$ of the associated torque trajectory M, the trajectory values $\phi_{T,k}, \ldots, \phi_{T,k+N}$ of the associated magnetic stator flux trajectory $\phi$ and the trajectory values $U_{NP,k}, \ldots, U_{NP,k+N}$ of associated m−2 potential trajectories $U_{NP}$ with respect to the k-th sampling time up to the (k+N)-th sampling time are within the respective predetermined value range. In this manner, computation time can be saved since steps (b) and (c) and steps (e) to (i) can be omitted. It goes without saying that steps (b) to (i) are then applied and step (k) is not applied if the abovementioned criteria for the trajectory values $M_{T,k}, \ldots, M_{T,k+N}$; $\phi_{T,k}, \ldots, \phi_{T,k+N}$; $U_{NP,k}, \ldots, U_{NP,k+N}$ are not fulfilled.

Mention will be made of the fact that step (k) can likewise be implemented in the form of software and this software can then be loaded, for example, onto a computer system, in particular using a digital signal processor, and run on this computer system.

It has proven to be advantageous for a linear extrapolation to be selected for the extrapolation of the trajectory values $M_{T,k+N-1}$, $M_{T,k+N}$ of the torque trajectory M, and for a quadratic extrapolation to be selected for the extrapolation of the trajectory values $\phi_{T,k+N-1}$, $\phi_{T,k+N}$ of the magnetic stator flux trajectory $\phi$. In this case, by selection of a quadratic extrapolation for the magnetic stator flux trajectory $\phi$ in combination with the selection of a linear extrapolation for the torque trajectory M, it becomes possible to predict particularly accurately the behavior of the overall system, with the result that the selection of the switching state combination $SK_{a,k}$ can be made even more precise and, as a result, a further reduction in the switching frequency of the power semiconductor switches results. As an alternative, for m≧3, in each case a linear extrapolation can be selected for the extrapolation of the trajectory values $M_{T,k+N-1}$, $M_{T,k+N}$ of the torque trajectory M and the trajectory values $U_{NP,k+N-1}$, $U_{NP,k+N}$ of the m−2 potential trajectories $U_{NP}$, and a quadratic extrapolation can be selected for the extrapolation of the trajectory values $\phi_{T,k+N-1}$, $\phi_{T,k+N}$ of the magnetic stator flux trajectory $\phi$, in which case the same mentioned advantages result.

It is also conceivable for in each case a linear extrapolation to be selected for the extrapolation of the trajectory values $M_{T,k+N-1}$, $M_{T,k+N}$ of the torque trajectory M and the trajectory values $\phi_{T,k+N-1}$, $\phi_{T,k+N}$ of the magnetic stator flux trajectory $\phi$, in which case, for m≧3, in each case a linear extrapolation is selected for the extrapolation of the trajectory values $M_{T,k+N-1}$, $M_{T,k+N}$ of the torque trajectory M, the trajectory values $\phi_{T,k+N-1}$, $\phi_{T,k+N}$ of the magnetic stator flux trajectory $\phi$ and, in addition, for the extrapolation of the trajectory values $U_{NP,k+N-1}$, $U_{NP,k+N}$ of the m−2 potential trajectories $U_{NP}$.

One further possibility consists in in each case a quadratic extrapolation being selected for the extrapolation of the trajectory values $M_{T,k+N-1}$, $M_{T,k+N}$ of the torque trajectory M and the trajectory values $\phi_{T,k+N-1}$, $\phi_{T,k+N}$ of the magnetic stator flux trajectory $\phi$, in which case, for m≧3, in each case a quadratic extrapolation is selected for the extrapolation of the trajectory values $M_{T,k+N-1}$, $M_{T,k+N}$ of the torque trajectory M and the trajectory values $\phi_{T,k+N-1}$, $\phi_{T,k+N}$ of the magnetic stator flux trajectory $\phi$, and, in addition, a linear extrapolation is selected for the extrapolation of the trajectory values $U_{NP,k+N-1}$, $U_{NP,k+N}$ of the m−2 potential trajectories $U_{NP}$.

LIST OF REFERENCES

1 Rotating electrical machine
2 Converter circuit for connecting three voltage levels
3 DC voltage circuit
4 Part-converter system
5 First switching group
6 Second switching group
7 Third switching group

The invention claimed is:
1. A method for operating a rotating electrical machine, the rotating electrical machine being connected in terms of phase to a converter circuit, having a DC voltage circuit, for connecting m voltage levels, where m≧2, having the following steps
    (a) connection of phases of the converter circuit to the DC voltage circuit in accordance with a selected switching state combination of switching states for power semiconductor switches in the converter circuit,
    wherein the selection of the switching state combination takes place in the following further steps:
    (b) beginning with a starting sampling time k for a selectable number N of sampling times:
        determination of all the permissible switching state combinations at each of the N sampling times, where N≧1,
    (c) formation of switching state sequences for each determined switching state combination at the starting sampling time k, each switching state sequence being an arrangement of determined switching state combinations of the N sampling times next to one another in a row, said switching state combinations being associated with the respective switching state combination at the starting sampling time k,

(d) for each of the switching state sequences, calculation of a torque trajectory of the rotating electrical machine and a magnetic stator flux trajectory of the rotating electrical machine from determined state value sets of the rotating electrical machine and the converter circuit for the starting sampling time k up to the sampling time k+N, (e) selection of the switching state sequences in which an associated torque trajectory and a magnetic stator flux trajectory at the (k+N)-th sampling time are in each case within a predetermined value range, or in which the trajectory values of an associated torque trajectory and the trajectory values of an associated magnetic stator flux trajectory with respect to the k-th sampling time up to the (k+N)-th sampling time approach the respective predetermined value range, (f) for each of the selected switching state sequences, determination of the number of times n until the extrapolation of the trajectory values of the associated torque trajectory or the trajectory values of the magnetic stator flux trajectory with respect to the (k+N−1)-th sampling time and (k+N)-th sampling time is outside the respective predetermined value range, (g) for each of the selected switching state sequences, determination of the total number of switching transitions s of the associated determined switching state combinations, (h) for each of the selected switching state sequences, calculation of a quality value c from the number of times n and the total number of switching transitions s, (i) setting that determined switching state combination at the starting sampling time k as the selected switching state combination with which the quality value c of the associated selected switching state sequence is at its smallest, (j) repetition of steps (a) to (i), where k=k+1.

2. The method as claimed in claim 1, wherein, for m≧3, the converter circuit for connecting m voltage levels has m−2 subconnections at the DC voltage circuit and, with respect to step (d), for each of the switching state sequences, in addition m−2 potential trajectories for potentials at the m−2 subconnections are calculated from determined state value sets of the rotating electrical machine and the converter circuit for the starting sampling time k up to the sampling time k+N, wherein, with respect to step (e), the switching state sequences are selected in which, in addition, associated m−2 potential trajectories at the (k+N)-th sampling time are in each case within a predetermined value range, or in which, in addition, the trajectory values of associated m−2 potential trajectories with respect to the k-th sampling time up to the (k+N)-th sampling time approach the respective predetermined value range, and wherein, with respect to step (f), for each of the selected switching state sequences, the number of times n is determined until the extrapolation of the trajectory values of the associated torque trajectory or the trajectory values of the magnetic stator flux trajectory or the trajectory values of the m−2 potential trajectories with respect to the (k+N−1)-th sampling time and (k+N)-th sampling time is outside the respective predetermined value range.

3. The method as claimed in claim 1, comprising the further step (k):

omission of step (b) and step (c) and formation of a switching state sequence for the preceding selected switching state combination, the switching state sequence being an arrangement of N preceding selected switching state combinations next to one another in a row, and setting the preceding selected switching state combination as the selected switching state combination and application of step (d) and omission of steps (e) to (i) if the trajectory values of the associated torque trajectory and the trajectory values of the associated magnetic stator flux trajectory with respect to the k-th sampling time up to the (k+N)-th sampling time are within the respective predetermined value range.

4. The method as claimed in claim 2, comprising the further step (k):

omission of step (b) and step (c) and formation of a switching state sequence for the preceding selected switching state combination, the switching state sequence being an arrangement of N preceding selected switching state combinations next to one another in a row, and setting the preceding selected switching state combination as the selected switching state combination and application of step (d) and omission of steps (e) to (i) if the trajectory values of the associated torque trajectory, the trajectory values of the associated magnetic stator flux trajectory and the trajectory values of associated m−2 potential trajectories with respect to the k-th sampling time up to the (k+N)-th sampling time are within the respective predetermined value range.

5. The method as claimed in claim 1, wherein in each case a linear extrapolation is selected for the extrapolation of the trajectory values of the torque trajectory and the trajectory values of the magnetic stator flux trajectory.

6. The method as claimed in claim 2, wherein in each case a linear extrapolation is selected for the extrapolation of the trajectory values of the torque trajectory, the trajectory values of the magnetic stator flux trajectory and the trajectory values of the m−2 potential trajectories.

7. The method as claimed in claim 1, wherein in each case a quadratic extrapolation is selected for the extrapolation of the trajectory values of the torque trajectory and the trajectory values of the magnetic stator flux trajectory.

8. The method as claimed in claim 2, wherein in each case a quadratic extrapolation is selected for the extrapolation of the trajectory values of the torque trajectory and the trajectory values of the magnetic stator flux trajectory, and wherein a linear extrapolation is selected for the extrapolation of the trajectory values of the m−2 potential trajectories.

9. The method as claimed in claim 1, wherein a linear extrapolation is selected for the extrapolation of the trajectory values of the torque trajectory, and wherein a quadratic extrapolation is selected for the extrapolation of the trajectory values of the magnetic stator flux trajectory.

10. The method as claimed in claim 2, wherein in each case a linear extrapolation is selected for the extrapolation of the trajectory values of the torque trajectory and the trajectory values of the m−2 potential trajectories, and in that a quadratic extrapolation is selected for the extrapolation of the trajectory values of the magnetic stator flux trajectory.

11. The method as claimed in claim 1, wherein the quality value c is calculated by dividing the total number of switching transitions s by the number of times n.

* * * * *